United States Patent [19]
Buddendeck et al.

[11] Patent Number: 6,079,918
[45] Date of Patent: Jun. 27, 2000

[54] ROTARY POWER TOOL WITH HYDRAULICALLY ACTUATED CHUCK

[75] Inventors: Keith Buddendeck, Clemson; Jeremy Grayson, Columbia; Ronald W. Miksa, Central, all of S.C.

[73] Assignee: Power Tool Holders, Inc., Christiana, Del.

[21] Appl. No.: 09/197,261

[22] Filed: Nov. 20, 1998

[51] Int. Cl.⁷ .................................................... B23C 1/20
[52] U.S. Cl. ........................ 409/182; 279/4.09; 279/4.12; 279/50
[58] Field of Search ................................. 409/181, 182; 279/4.09, 4.12, 43, 50, 57, 74, 134, 135, 146; 60/571

[56] References Cited

U.S. PATENT DOCUMENTS

| | | |
|---|---|---|
| 425,224 | 4/1890 | Hartness . |
| 658,473 | 9/1900 | Smith et al. . |
| 1,117,480 | 11/1914 | Church .................................. 279/4.12 |
| 1,146,193 | 7/1915 | Miller .................................... 279/4.12 |
| 1,441,088 | 1/1923 | Hofstetter ............................. 279/4.12 |
| 1,874,232 | 8/1932 | Groene et al. ........................ 409/182 |
| 1,918,424 | 7/1933 | Pontow et al. ........................... 60/571 |
| 2,338,060 | 12/1943 | Redmer .................................... 279/50 |
| 2,354,966 | 8/1944 | Panza et al. . |
| 2,370,729 | 9/1945 | Hoppe . |
| 2,466,651 | 4/1949 | Zagar . |
| 2,478,102 | 8/1949 | Hull et al. ................................ 279/57 |
| 2,494,752 | 1/1950 | Gambell .................................. 60/571 |
| 2,562,143 | 7/1951 | Godfrey et al. ...................... 409/182 |
| 2,655,826 | 10/1953 | Goldsby . |
| 2,809,844 | 10/1957 | Tree ........................................ 279/50 |
| 3,095,205 | 6/1963 | Farnsworth . |
| 3,724,563 | 4/1973 | Wickham et al. . |
| 3,811,361 | 5/1974 | Seely et al. . |
| 3,814,448 | 6/1974 | Buck .................................... 279/4.12 |
| 3,835,649 | 9/1974 | Le Testu ............................. 279/4.09 |
| 4,690,415 | 9/1987 | Holdridge ................................ 279/50 |
| 5,188,492 | 2/1993 | McCracken . |
| 5,743,539 | 4/1998 | Vanderpol et al. . |

FOREIGN PATENT DOCUMENTS 1150-339   4/1985   U.S.S.R. .............................. 279/4.12

OTHER PUBLICATIONS

U.S. Patent Application entitled "Rotary Power Tool With Remotely Actuated Chuck", USSN 09/196,580, Filed Nov. 20, 1998.
U.S. Patent Application entitled "Horizontal Lever Actuated Chuck," USS 09/197,260, Filed Nov. 20, 1998.
U.S. Patent Application entitled "Rotary Power Tool with Remotely Actuated Chuck," USSN 09/067,629, Filed Apr. 28, 1998.

*Primary Examiner*—Andrea L. Pitts
*Assistant Examiner*—Erica D. Ergenbright
*Attorney, Agent, or Firm*—Nelson Mullins Riley & Scarborough, L.L.P.

[57] ABSTRACT

A rotary power tool has a remotely actuated chuck device. A hydraulic actuating system is incorporated in the power tool and is configured to move the chuck device between the gripping and release positions upon hydraulic fluid being supplied to at least one hydraulically driven actuator mounted relative to the tool casing and engaged with the chuck device to move the chuck between gripping and release positions.

11 Claims, 4 Drawing Sheets

ROTARY POWER TOOL WITH HYDRAULICALLY ACTUATED CHUCK

BACKGROUND OF THE INVENTION

The present invention relates to a rotary power tool, particularly a router, having a chuck device for holding a tool bit to a drive spindle wherein the chuck device is remotely actuated.

There are a number of well known types of power tools, including routers, wherein a chuck is mounted on the end of a rotatable drive spindle for holding a tool bit to the drive spindle. In many applications of these tools, it is necessary to manually manipulate or engage the chuck in order to change out the tool bit. A number of chuck devices utilize an axially movable outer sleeve member to actuate the chuck. For example, many such chuck devices have an axially movable outer sleeve that moves between a gripping position wherein the chuck grips upon a tool shank inserted into the chuck, and a release position wherein the chuck releases the tool shank inserted therein. Such chuck devices are commonly referred to as "quick-change" chucks. For example, one such chuck is illustrated and described in U.S. Pat. No. 5,810,366. Additional examples of such chucks are illustrated in U.S. Pat. Nos. 4,692,073; 2,807,473 and 3,521,895. U.S. patent application Ser. No. 09/067,569 describes another type of sleeve actuated chuck.

In certain operating environments, particularly with high speed routers, there is limited space in the critical area of the chuck device and tool bit to actuate the chuck for removal or insertion of the tool bit and the operation of changing out the tool bits can be potentially dangerous. With many conventional tools, the chucks are actuated by an external mechanism, such as a wrench or other tool. There is, however, a trend in the industry to incorporate quick-change chucks with such tools, particularly routers, to eliminate the necessity of external tools for operating the chucks and to take advantage of the obvious benefits of the quick-change chucks. However, the operation of actuating these quick-change chucks may also be cumbersome and potentially dangerous, especially where the operator must insert his hands next to the cutting edges of the tool bit.

The present invention provides an apparatus for remotely actuating a quick-change chuck device on rotary power tools, particularly routers, in a safe and quick manner.

OBJECTS AND SUMMARY OF THE INVENTION

It is therefore a principal object of the present invention to provide a power rotary tool that incorporates a mechanism for remotely actuating a chuck, in particular a quick-change chuck, for any manner of power tool.

An additional object of the present invention is to provide a mechanism for safely changing out tool bits in rotary power tools wherein the operator's hands are totally removed from the cutting area of the tool bit.

And still a further object of the present invention is to provide a mechanism for remotely actuating chucks on rotary power tools so that actuation of the chuck is no longer limited by manual hand strength.

And still a further object of the present invention is to provide a actuation mechanism for quick-change chucks that is particularly suited for high speed routers.

Additional objects and advantages of the invention will be set forth in part in the following description, or may be obvious from the description, or may be learned through practice of the invention.

In accordance with the objects and purposes of the invention, a rotary power tool is provided having a remotely actuated chuck device mounted on the end of a rotatable drive spindle. The rotary power tool will be described herein as a router. However, it should be appreciated that the present invention is not limited to any particular rotary power tool, and has application wherever it may be desired to remotely actuate a quick-change type of chuck, for example with power drills, drill presses, lathes, milling machines, sanders, grinders, and the like.

It should also be appreciated that the present invention is not limited to any particular type of chuck device and, in this regard, the internal working mechanism of the chuck device is not particularly important to the invention or necessary for an understanding of the invention. It is intended that the present invention be utilized with any manner of chuck device that is actuated between a gripping and release position by axial movement of a member of the chuck device, such as an outer sleeve member.

The rotary power tool according to the invention includes a hydraulic actuating system that is operably configured to move the chuck device between the gripping and release positions. The hydraulic actuating system includes at least one hydraulically driven actuator mounted relative to the casing and engaged with the chuck device to move the chuck device between the gripping and release positions upon supplying a hydraulic fluid to the actuator.

In a preferred embodiment, the hydraulic actuating system is a self-contained sealed system. For example, this system may include a piston member movable within a sealed master cylinder. The piston member divides the cylinder into two chambers which are in fluid communication with the actuator so that movement of the piston within the master cylinder will direct hydraulic fluid from one of the chambers to the actuator to move the actuator to the gripping or release position, depending on the direction of movement of the piston within the master cylinder.

The hydraulic actuator may comprise a slave piston that is movable within a sealed slave cylinder. The slave piston divides the slave cylinder into two chambers, each of the chambers being in fluid communication with a respective one of the master cylinder chambers. In this manner, movement of the piston member in one direction within the master cylinder causes corresponding movement of the slave piston in the slave cylinder. The slave piston is mechanically engaged with the chuck device, for example through a lever or linkage mechanism, so that movement of the slave piston causes the chuck device to move between gripping and release positions.

In the embodiment wherein the chuck device comprises an axially movable outer sleeve, an engaging member is disposed between the outer sleeve and the end of the slave piston for transferring movement of the slave piston to the outer sleeve. This engaging member may be pivotally mounted on the casing, or may comprise a fork-like member having one leg attached to the slave piston and two fork legs attached to the outer sleeve at radially opposite positions. This fork-like member may also be pivotally mounted on the casing.

The hydraulic actuating system according to the invention may also comprise a manual pumping system arranged to pump pressurized fluid to the hydraulic actuator in either direction upon manual operation of one or more hydraulic pumps. In this embodiment, the actuator may comprise a similar type of slave piston and slave cylinder arrangement wherein the slave piston divides the slave cylinder into two chambers, with each of the chambers in fluid communication with the pumping system. The pumping system may comprise a first pump that is aligned to pump fluid to one of the slave cylinder chambers, and a second pump aligned to pump fluid to the other slave cylinder chamber. A switching device may be aligned to switch operation between the first and second pumps.

The hydraulic actuating system is particularly useful on power routers that include a base member movable axially relative to the casing for establishing a working position of the chuck device relative to a work piece. In conventional fixed-base routers, the base member is rotatably advanceable on the casing for changing the working position and, in this embodiment, the actuator may be mounted on an upper surface of the casing generally within an inner circumference of the base member so as not to interfere with rotational movement of the base member relative to the casing.

The hydraulic actuating system according to the invention may also be used with other conventional routers, such as conventional plunge-type base routers.

The preferred embodiments of the present invention will now be discussed in detail below with reference to the following figures.

DETAILED DESCRIPTION

Figure 1:
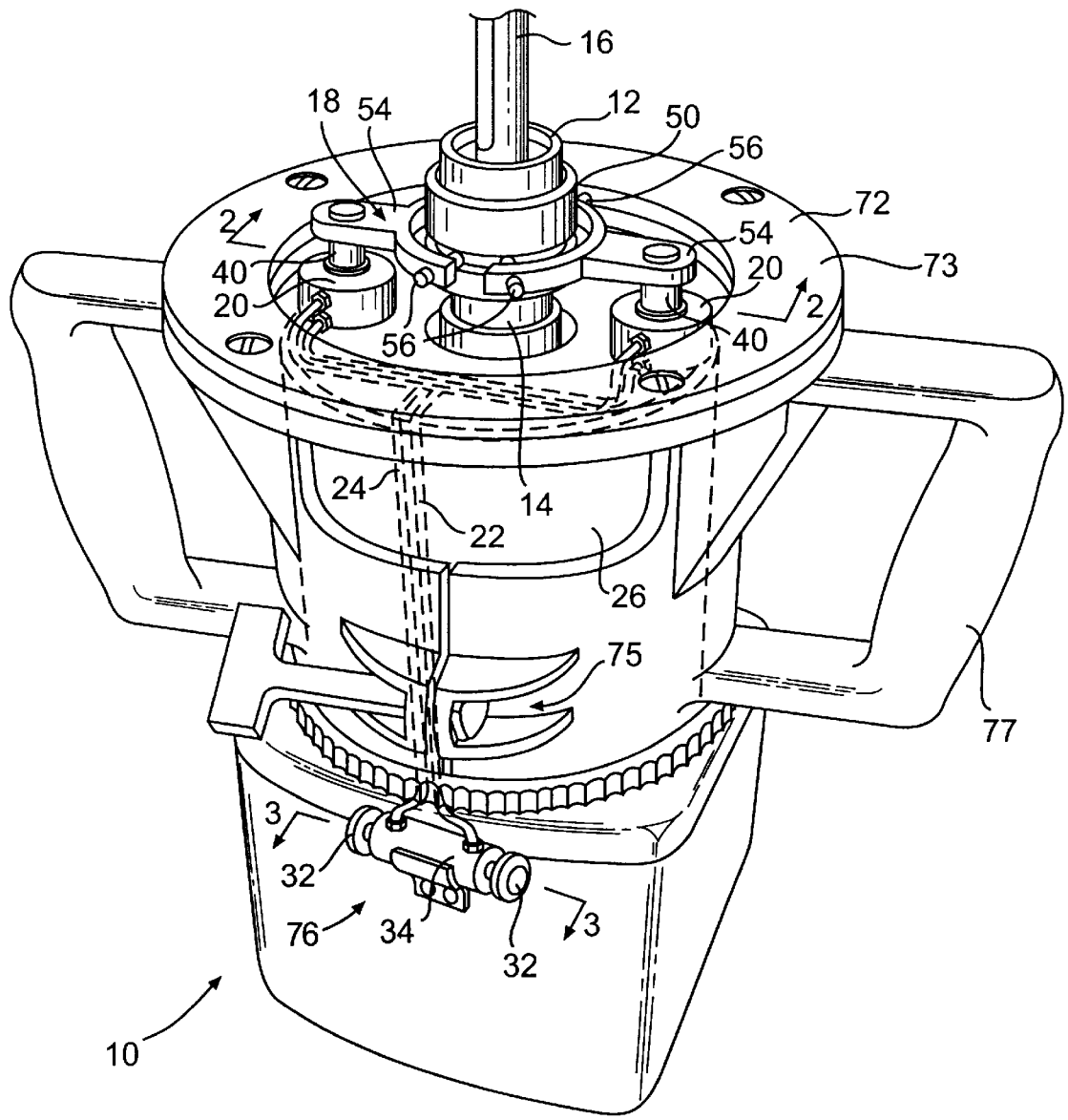
FIG. 1 is a perspective view of a power tool, particularly a router, according to the present invention.

Reference will now be made in detail to the presently preferred embodiments of the invention, one or more examples of which are illustrated in the drawings. Each explanation is provided by way of explanation of the invention, and not meant as a limitation of the invention. For example, features illustrated or described as part of one embodiment can be used on another embodiment to yield still a third embodiment. It is intended that the present invention include such modifications and variations as come within the scope and spirit of the invention.

The present invention relates to power tools in general. For example, referring to FIGS. 1 and 4, a conventional router is illustrated as power tool 10. It should be appreciated, however, that the present invention is not limited to any particular type of power tool and may include, for example, power drills, drill presses, lathes, milling machines, sanders, grinders, and any manner of conventional power tool. Tool 10 is illustrated as a router in the figures as an example and for ease of explanation of the invention. It should be appreciated that the present invention relates to any manner of power tool incorporating a chuck device, generally 12, that is actuated by axial movement of a member of the chuck, for example an outer sleeve member 50.

It should also be appreciated that the type of chuck 12 is not particularly important to the invention. The invention applies to any manner of chuck, for example the chucks described and illustrated in the patent and applications discussed above, wherein the chuck 12 is actuated by moving a member, for example outer sleeve 50, relative to a body member or drive spindle 14 of the power tool. In this regard, chuck 12 will not be described in detail herein as it is not necessary for an understanding of the invention. One particular type of chuck for which the present invention is particularly applicable is illustrated and described in U.S. Pat. No. 5,810,366 and U.S. patent application Ser. No. 09/067,569 commonly owned by assignee Power Tool Holders Incorporated, the entire disclosures of which are incorporated herein by reference in their entirety for all purposes.

The chuck illustrated in the present figures is similar to the chuck illustrated and described in pending application Ser. No. 09/067,569. With this particular type of chuck, an axial bore is defined by a plurality of longitudinally extending gripping segments separated by axially extending slits. An axially movable sleeve member 50 surrounds the gripping segments. The gripping segments are compressed radially inward upon axial movement of the sleeve member to a gripping position to grip upon a tool 16 inserted into the bore. The tool is released when the gripping segments move to a release position upon opposite axial movement of the sleeve.

A chuck 12 useful in the present invention includes some structural mechanism, such as outer sleeve 50 having a circumferential groove 52 or ridge (not illustrated) defined therein, for engagement with an engaging member, generally 54. Circumferential groove 52 may be formed as an integral component of sleeve 50 or, in an alternative embodiment, an additional outer sleeve or ring member defining circumferential groove 52 may be fitted onto sleeve member 50. This embodiment may be particularly useful in retrofitting the present invention to existing power tools and chucks.

Referring again to the figures in general, tool 10 includes a casing 26 that houses a rotationally driven drive spindle 14. Casing 26 is also the housing member for the drive spindle motor (not shown).

The router embodiment of the invention includes a base member, generally 72, as is commonly understood in the art. The particular router illustrated in the figures is a conventional fixed-base router and base member 72 is thus rotatably axially advanceable relative to casing 26 by rotating base 72 relative to the casing. Upon rotation of base 72, working surface 73 is axially positioned to establish a working position of tool 16 held by chuck device 12 relative to a work piece. The operation of this type of base member is conventional and known to those skilled in the art. In general, an operator releases locking device 75 of base member 72 and adjusts the base member by rotating handle 77 causing base member 72 to move axially relative to casing 26.

Although not illustrated, it should be appreciated that the present invention is just as applicable to conventional routers incorporating plunge-style bases, as are commonly known in the art.

Tool 10 according to the invention also includes a hydraulic actuating system, generally 18. The hydraulic system 18 is configured to move chuck device 12 between a gripping position wherein chuck 12 grips upon tool 16 held therein, and a release position wherein chuck device 12 is axially moved and releases tool 16 held therein. Actuating system 18 includes at least one hydraulically drive actuator, generally 20, mounted relative to casing 26, preferably on an upper surface 74 thereof. Actuator 20 receives hydraulic fluid from a hydraulic sending system, generally 76, and is engaged with chuck device 12 through, for example, engaging member 54 to move chuck device 12 axially upon hydraulic fluid being supplied to the actuator in either direction.

Preferably, hydraulic system 18 is a self-contained sealed system, as generally illustrated in the figures. In one preferred embodiment illustrated in FIGS. 1 through 3, system 18 includes a master cylinder 34 defining chambers 36 and 38. A piston member 28 is movable through cylinder 34 and flange member 30 with seal 31 define chambers 36 and 38. Push knobs or other surfaces 32 are provided on the opposite ends of piston 28. A line 22 is in fluid communication with chamber 38 and a separate line 24 is in communication with chamber 36. Since the system is a sealed hydraulic system, movement of flange and seal 30, 31 within cylinder 34 in either direction causes hydraulic fluid to be forced from one chamber and through lines 22, 24 into the opposite chamber, depending on the direction of movement of piston 28. Piston 28 is manually movable by the operator simply pushing on either of knobs 32.

Figure 2:
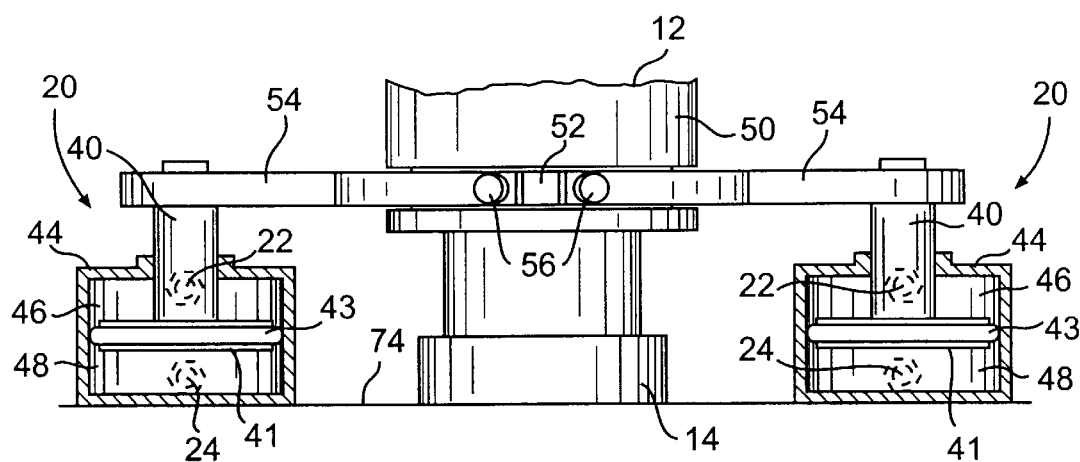
FIG. 2 is an enlarged perspective partial cut-away view of the hydraulic actuators according to the invention taken along the lines 2—2 indicated in FIG. 1.
Figure 3:
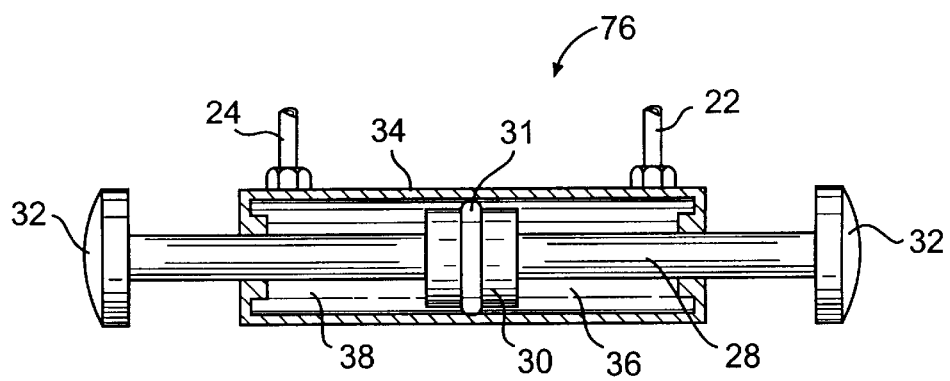
FIG. 3 is a cut-away view of an embodiment of the hydraulic sending unit taken along the lines 3—3 indicated in FIG. 1.

Referring to FIG. 2, actuators 20 comprise a slave cylinder 44 mounted on surface 74 and defining chambers 46, 48. Slave piston 40 is movable within cylinder 44 and flange 41 with seal 43 define chambers 46 and 48. Upper chamber 46 is in fluid communication with master cylinder 34 through line 22, and lower slave chamber 48 is in fluid communication with the opposite chamber of master cylinder 34 through line 24. Thus, it should be understood, that if the piston 28 illustrated in FIG. 3 is moved to the right, fluid under pressure is forced through line 22 to upper chambers 46 of slave cylinder 44 thus forcing pistons 40 downward with fluid being forced out of chambers 48, through line 24, and into chamber 36 of master cylinder 34. Pistons 40 are operably engaged with sleeve 50 and thus the sleeve is moved axially downward. To move the sleeve axially upward, the reverse operation is performed.

It should be appreciated by those skilled in the art that the hydraulic actuating system illustrated in FIGS. 2 and 3 is but one example of any number of combination of elements that could be incorporated for hydraulically moving chuck device 12, and that any and all such combinations are within the scope and spirit of the invention.

Figure 4:
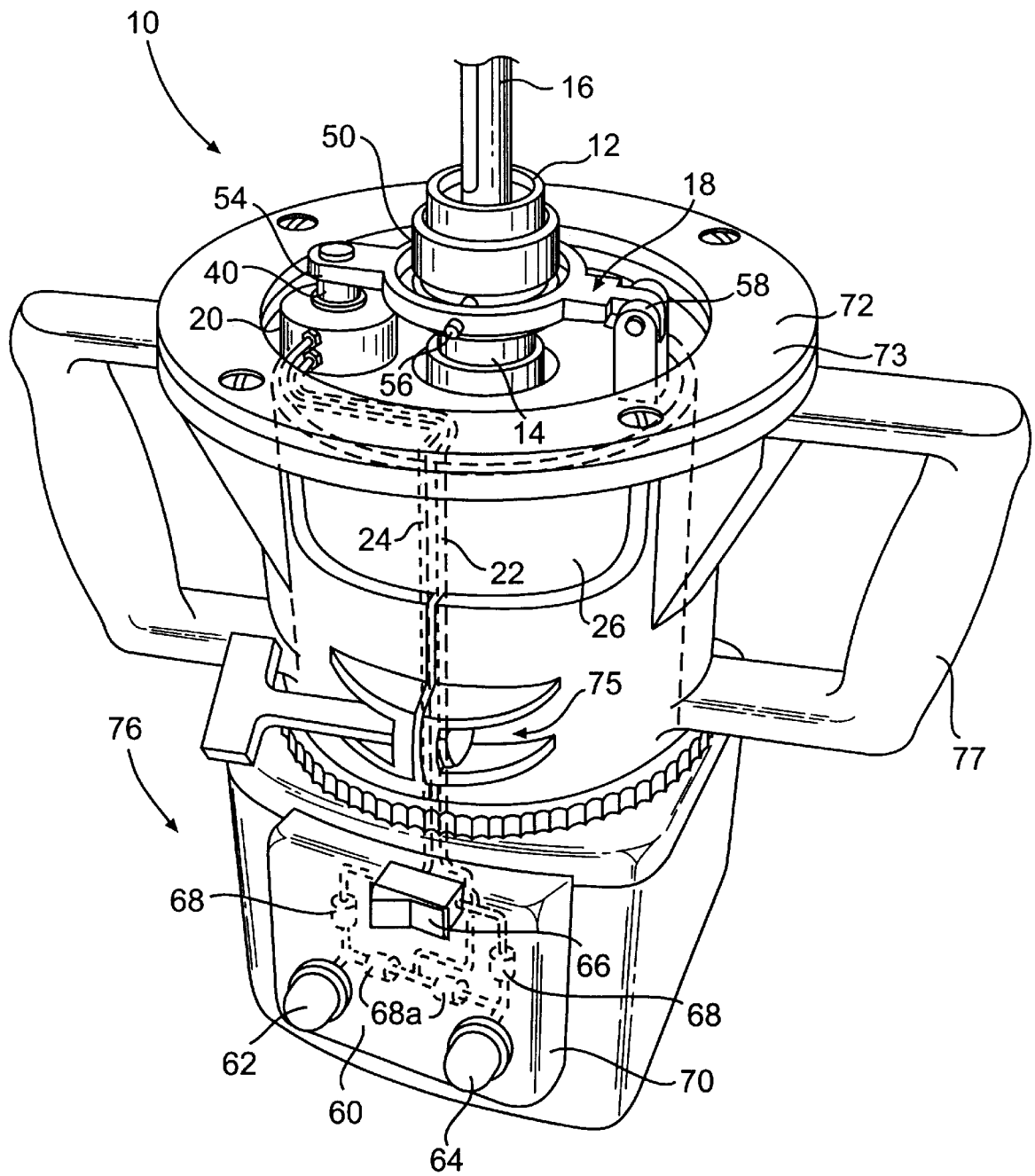
FIG. 4 is a perspective view of an alternate embodiment of the power tool according to the invention.

As illustrated in the figures, particularly FIGS. 2 and 4, slave pistons 40 are mechanically engaged with chuck device 12 so that movement of the slave pistons is imparted to the chuck device to move the chuck between the gripping and release positions. In the embodiments illustrated, an engaging member 54 is used to mechanically engage slave pistons 40 with chuck device 12. In the embodiments of FIGS. 1 and 2, engaging member 54 essentially comprises a fork-like member having one leg engaged with piston 40 and two opposite legs engaged with outer sleeve member 50 of chuck device 12 by way of pins 56 engaging in groove 52 defined in sleeve 50.

An alternative embodiment of engaging member 54 is illustrated in FIG. 4. In this embodiment, member 54 comprises an essentially yoke-like member having one leg engaged with slave piston 40 and the opposite leg pivotally mounted via a pivot mount 58. Engaging member 54 includes a central yoke section generally surrounding chuck device 12 with pins 56 engaging in groove 52. It should be appreciated that engaging member 54 can take on any configuration of linkage device or engaging member.

It should also be appreciated that the hydraulic actuating system 18 can include two actuators 20, as illustrated in FIG. 1 and described above, or a single actuator 20 as illustrated in FIG. 4. It should also be appreciated that the surface area of the master piston flange 30 relative to the surface area of slave piston flange 41 can be designed to provide a mechanical advantage for actuating chuck 12. For example, if the surface area of flange member 30 of master piston 28 is one half of the surface area of flanges 41 of slave pistons 40, a mechanical advantage of four to one is generated.

Figure 5:
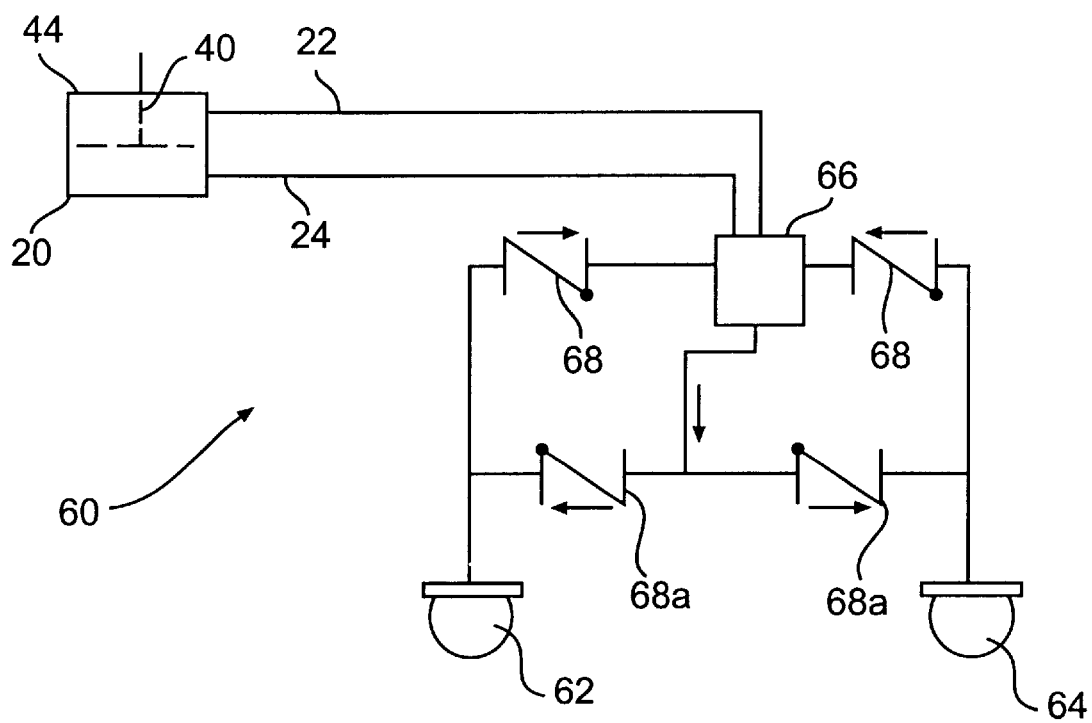
FIG. 5 is a diagrammatic view of one embodiment of the hydraulic actuating system according to the invention.

FIGS. 4 and 5 illustrate an alternative embodiment of the hydraulic actuating system 18 according to the invention. In this embodiment, system 18 comprises a pumping system, generally 60, wherein a manual pumping system may be used in place of a master cylinder arrangement. Referring to FIGS. 4 and 5, pumping system 60 includes two manually operable finger pumps 62, 64 extending through a casing. Pump 62 is disposed to provide pressurized fluid through line 24 to actuator 20, and pump 64 is disposed to provide pressurized fluid through line 22 to an opposite chamber of actuator 20. Although this system is illustrated with only a single actuator 20, it should be understood that dual actuators 20 could also be utilized, as in the embodiment of FIG. 1.

To move chuck device 12 axially downward with this system, the operator positions switch 66 (illustrated schematically), which may be a conventional movable valve arrangement, such that only pump 64 is capable of supplying pressurized fluid to actuator 20. The operator depresses pump 64 causing fluid to pass through an upper check valve 68, through valve arrangement 66 and to the upper chamber of slave cylinder 44 causing slave piston 40 to move downward. Fluid in the lower chamber is directed through line 24 and through lower check valve 68 a in a closed loop system. In this operation, pump 62 and its loop are essentially at a dead head.

To move piston 40 in the opposite direction, switch 66 is repositioned so that only pump 62 can supply pressurized fluid via line 24 to the underside of piston 40.

It should be appreciated by those skilled in the art that various modifications and variations can be made in the present invention without departing from the scope and spirit of the invention. For example, those skilled in the art are capable of designing any manner of hydraulic system for supplying fluid under pressure to a hydraulic actuator that in turn causes a chuck device to move axially. The hydraulic actuating system described herein are but mere examples of any number of suitable configurations. It is intended that the present invention include such modifications and variations as come within the scope of the appended claims and their equivalents.

What is claimed is:

1. A rotary power tool having a remotely actuated chuck device, said power tool comprising:

a casing housing a rotationally driven drive spindle;

a chuck device attached to an end of said drive spindle, said chuck device movable between a gripping position wherein said chuck device clamps upon a tool held therein, and a release position wherein said chuck device releases a tool held therein; and a hydraulic actuating system operably configured to move said chuck device between said gripping and release positions, said hydraulic actuating system comprising at least one hydraulically driven actuator engaged with said chuck device to move said chuck device between said gripping and release positions;

wherein said hydraulic actuating system is a self-contained sealed system;

wherein said hydraulic actuating system comprises a piston member movable within a sealed master cylinder, wherein upon movement of said piston member within said master cylinder, fluid is directed from said master cylinder to said at least one hydraulically driven actuator to move said chuck device;

said at least one actuator comprising a slave piston movable within a sealed slave cylinder, wherein movement of said piston member in one direction within said master cylinder causes corresponding movement of said slave piston in said slave cylinder;

said slave piston is mechanically engaged with said chuck device so that movement of said slave piston causes said chuck device to move between said gripping and release positions; and wherein said chuck device comprises an axially movable outer sleeve, and further comprising an engaging member disposed between said outer sleeve and an end of said slave piston for transferring movement of said slave piston to said outer sleeve.

2. The rotary power tool as in claim 1, wherein said engaging member is pivotally mounted on said casing.

3. The rotary power tool as in claim 1, wherein said engaging member is a fork-like member having one leg attached to said slave piston and two legs attached to said outer sleeve at radially opposite positions.

4. The rotary power tool as in claim 1, wherein said power tool is a router, and further comprising a base member movable relative to said casing and said chuck device for establishing a working position of said chuck device relative to a work piece.

5. The rotary power tool as in claim 4, wherein said base member is rotatably advanceable on said casing for changing said working position, said at least one hydraulically driven actuator mounted on an upper surface of said casing within an inner circumference of said base member so as not to interfere with rotational movement of said base member relative to said casing.

6. A rotary power tool having a remotely actuated chuck device, said power tool comprising:

a casing housing a rotationally driven drive spindle;

a chuck device attached to an end of said drive spindle, said chuck device movable between a gripping position wherein said chuck device clamps upon a tool held therein, and a release position wherein said chuck device releases a tool held therein; and a hydraulic actuating system operably configured to move said chuck device between said gripping and release positions, said hydraulic actuating system comprising at least one hydraulically driven actuator engaged with said chuck device to move said chuck device between said gripping and release positions;

wherein said power tool is a router, and further comprising a base member movable relative to said casing and said chuck device for establishing a working position of said chuck device relative to a work piece, said base member being rotatably advanceable on said casing for changing said working position, said at least one hydraulically driven actuator mounted on an upper surface of said casing within an inner circumference of said base member so as not to interfere with rotational movement of said base member relative to said casing; and wherein said hydraulic actuating system comprises a piston member movable within a sealed master cylinder, wherein upon movement of said piston member within said master cylinder, fluid is directed from said master cylinder to said actuator to move said chuck device, said master cylinder remotely disposed on said casing so as not to interfere with rotational movement of said base member relative to said casing.

7. A power router, comprising:

a casing housing a rotationally driven drive spindle;

a chuck device attached to an end of said drive spindle, said chuck device movable between a gripping position wherein said chuck device clamps upon a toot held therein, and a release position wherein said chuck device releases a tool held therein;

a base member movable relative to said casing and said chuck device for establishing a working position of said chuck device relative to a work piece;

a hydraulically actuated actuator mounted on said casing proximate to said chuck device, said actuator in operable engagement with said chuck device to move said chuck device between said gripping and release positions upon hydraulic fluid being directed to said actuator; and a hydraulic fluid sending system in fluid communication with said actuator.

8. The router as in claim 7, wherein said chuck device comprises an axially movable outer sleeve, said actuator engaged with said outer sleeve.

9. The router as in claim 7, wherein said hydraulic fluid sending system comprises a piston member movable within a sealed master cylinder, said piston member dividing said cylinder into two chambers, said chambers in fluid communication with said actuator wherein upon movement of said piston member within said master cylinder, fluid is directed from said master cylinder to said actuator to move said chuck device.

10. The router as in claim 7, wherein said hydraulic fluid sending system comprises a manual pumping system.

11. The router as in claim 7, wherein said base member is rotatably advanceable on said casing for changing said working position, said actuator mounted on an upper surface of said casing within a circumference of said base member so as not to interfere with rotational movement of said base member relative to said casing.

* * * * *